Oct. 10, 1939.  A. J. BENETEAU  2,175,591

EDUCATIONAL GAME OF THE GEOGRAPHIC TYPE

Filed Nov. 22, 1937

INVENTOR.
AMEDEE J. BENETEAU.
BY
ATTORNEYS.

Patented Oct. 10, 1939

2,175,591

UNITED STATES PATENT OFFICE 2,175,591

EDUCATIONAL GAME OF THE GEOGRAPHIC TYPE

Amedee J. Beneteau, Ottawa, Ontario, Canada

Application November 22, 1937, Serial No. 175,836
In Canada March 30, 1937

1 Claim. (Cl. 35—40)

This invention relates to improvements in educational games and pertains more especially to a game of the geographical type wherein a map is employed having various accessories associated therewith, whereby the player or players may be able to test their knowledge of the location of the various political divisions and physical features of the country.

The prime object of the invention is to provide a game of a character which may be played by one or more persons, individually interested in the conclusion or as partners.

Another object of importance resides in the elements employed which are capable of being manufactured at a very low cost due to their extreme simplicity and which thus permits the same to be supplied schools at a permissible cost with the end in view of rendering the study of geography a recreational exercise and enabling the players to obtain an appreciable knowledge thereof within a limited period of time.

These important objects and advantages will become apparent as the game is better understood from the following specification and claim.

Figure 1:
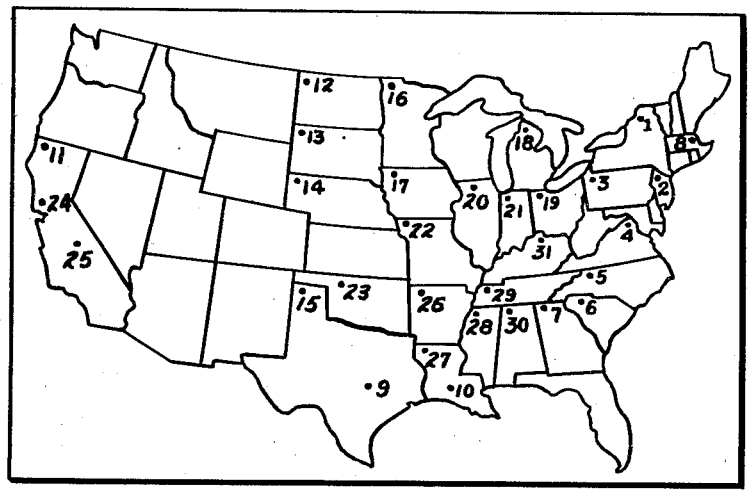
Figure 1 is a plan view of a map for use with my educational game.
Figure 2:
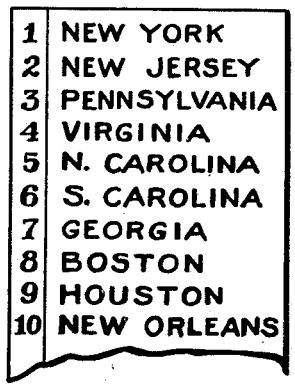
Figure 2 is a plan view of a check list for use in determining the number designations.
Figure 4:
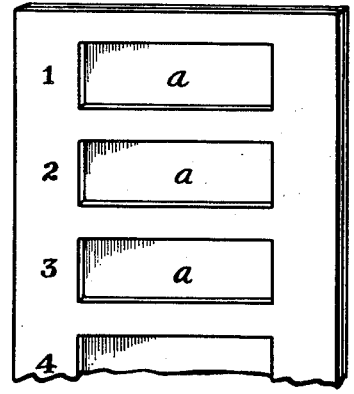
Figure 4 is a perspective view of the playing board.
Figure 3:
Figure 3 is a perspective view of one of the playing cards.

In the plan view in Figure 1 a map is shown on which each state or city, etc. is designated by a numeral. A check list is shown in Figure 2 on which are numbered names of states, cities, etc., the numeral opposite each name being the same as the numeral which stands for this said name on the map as shown in Figure 1. One of the many rectangular shaped cards used in playing this game is shown in Figure 3, each one of which bears one of the geographical names which appears on the check list (Figure 2), there being as many cards as there are names on the check list. In Figure 4 I have shown a card frame, this being made of thick cardboard or other suitable material from which rectangular pieces (a, a, a, a) have been removed, each opening being sufficiently large to contain one of the rectangular shaped cards (Figure 3). This frame is to be mounted on a suitable backing piece as indicated so that the cards will not fall through the openings in the same frame when lifted. The openings or cavities in this said frame are to be numbered, the numerals corresponding to those used on the check list.

After mixing the cards (Figure 3) the player turns up the top card, examines the geographical name on it, consults the map, and selects thereon a numeral which he thinks stands for the geographical name mentioned on the card. He then places the said card on the card frame (Figure 4) in the cavity opposite the numeral corresponding to the numeral selected on the map. For example, if the card bears the name Boston, the player should place it in the cavity No. 8, since the city of Boston is indicated on the map by the numeral 8. After all the cards have been played thus, the player checks the various plays by comparing the order of the cards on the card frame with that of the check list. By subtracting the number of cards wrongly placed from the total number of cards played, the player may determine his score. After the game, the player may refer to the map in order to learn the location of the places which he has missed and eventually obtain a perfect score.

This game may be played by a whole class of pupils. Each pupil arranges the cards on his card frame as explained above, then the pupils exchange card frames, and as the teacher reads off the check list, they mark the errors by covering each misplaced card with a blank card. The card frames are then returned to the individual owners and the pupil who obtains the highest score wins the game. This game will also make it possible for the teacher to conduct interesting "matches" between two groups of pupils, thereby stimulating the children in the study of geography. Likewise, this game will prove interesting and instructive as a parlor game as most people who have some degree of education are interested in the study of geography.

It is to be understood that this game is to cover all the countries of the world and that it involves not only the location of political divisions such as states, provinces, cities, towns, etc., but likewise the location of oceans, seas, lakes, rivers, mountains, gulfs, islands, bays, etc. It is obvious therefore that one who becomes an expert at playing this game gains an accurate knowledge of the various political divisions and physical divisions of countries of the world. It may even be prepared with the end in view of familiarizing the player with the most important streets, points of interest, etc., of the great cities of the world.

It is to be understood, also, that specific changes can be made in the shape, size, and material of the various accessories associated with this game without departing from the spirit of the invention or the scope of the appended claim.

The shuffling of the cards makes for an almost infinite variation in the order of occurrence of the cards. This factor renders the game more difficult to play, makes it more interesting and fixes more deeply in the minds of the players the geographical knowledge to be gained from the game.

The improvement in the game for which Patent No. 1,597,562 was granted, is the substitution, in the new game, of the card frame described in the above specification (Figure 4) for the list of names described in Figure 2, Patent No. 1,597,562. The advantages of this substitution are as follows:

(1) The new game is complete in itself and may be played indefinitely without additional material. In the old game, a new name list is needed, each time the game is played, and in the classroom, these name lists have to be supplied continually to the pupils at additional cost.

(2) In the old game, there is a fixed order of occurrence of the places to be located by the players as the name lists have to be printed. In the new game, the shuffling of the cards makes for an almost infinite variation in the order of occurrence of the cards. Hence, the new game is more difficult to play and is therefore more fruitful in its results.

(3) In the old game, the player is required to write certain numbers opposite the words which appear on the name list. In the new game, this process is substituted by the placement of cards in slots in card frame. It is obvious that from the standpoint of children especially, the process employed in the new game will be more interesting.

Having thus described my invention, what I claim as new is:

An educational game comprising the combination of a map with indicia thereon replacing names of various geographical entities, a plurality of uniform cards each bearing the name of the geographical entity replaced by the indicia on the map, a check list bearing the names of said geographical entities in conjunction with the indicia replacing the same, and a card frame comprising a plurality of identical cavities for receiving and holding the cards, said cavities being indicated by indicia in the same order as that appearing on the list.

AMEDEE J. BENETEAU.